US008312532B2

(12) United States Patent
Takeyoshi et al.

(10) Patent No.: US 8,312,532 B2
(45) Date of Patent: Nov. 13, 2012

(54) CONNECTION SUPPORTING APPARATUS

(75) Inventors: Haruyuki Takeyoshi, Kawasaki (JP); Naoki Matsuoka, Kawasaki (JP); Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1090 days.

(21) Appl. No.: 11/700,022

(22) Filed: Jan. 31, 2007

(65) Prior Publication Data
US 2008/0072312 A1    Mar. 20, 2008

(30) Foreign Application Priority Data

Sep. 14, 2006    (JP) .................................. 2006-249533

(51) Int. Cl.
*H04L 29/00*    (2006.01)
(52) U.S. Cl. .............. 726/15; 726/14; 713/153; 713/171
(58) Field of Classification Search .................. 713/153, 713/171; 726/14, 15
See application file for complete search history.

(56) References Cited

U.S. PATENT DOCUMENTS

| 6,938,155 | B2 * | 8/2005 | D'Sa et al. ..................... 713/160 |
| 7,665,132 | B2 | 2/2010 | Hisada et al. |
| 2002/0018456 | A1 | 2/2002 | Kakemizu et al. |
| 2006/0143702 | A1 * | 6/2006 | Hisada et al. ................... 726/15 |
| 2007/0006296 | A1 * | 1/2007 | Nakhjiri et al. ................. 726/15 |
| 2008/0232382 | A1 | 9/2008 | Iwama et al. |

FOREIGN PATENT DOCUMENTS

| JP | 2002-44141 A | 2/2002 |
| JP | 2002-111732 | 4/2002 |
| JP | 2005204086 | 7/2005 |
| WO | 2005004418 A1 | 1/2005 |

OTHER PUBLICATIONS

Notice of Reason for Rejection issued in the corresponding Japanese Patent Application No. 2006-249533 dated Jan. 11, 2011.

* cited by examiner

*Primary Examiner* — Jeffrey Pwu
*Assistant Examiner* — Helai Salehi
(74) *Attorney, Agent, or Firm* — Murphy & King, P.C.

(57) ABSTRACT

Provided is a connection supporting apparatus for supporting to establish a VPN through an IKE between a client and a gateway, comprising, a mode judging unit receiving authentication information of the client employed in the IKE, and judging whether or not a key exchange mode of the client is a main mode based upon the authentication information, a VPN setting request transmitting unit transmitting a VPN setting request to the gateway when the key exchange mode of the client is the main mode, the VPN setting request containing a client IP address as an authentication ID and information as to a communication key to be used when the client executes the IKE; and a notifying unit notifying both the communication key and the IP address to the client when the notifying unit receives a response with respect to the VPN setting request from the gateway.

11 Claims, 16 Drawing Sheets

FIG. 6

```
INVITE sips:homegateway@carrier.net  SIP/2.0
Via: SIP/2.0/TLS remoteaccessportal@carrier.net;branch=z9hG4bKxxxxxx
Max-Forwards: 70
From: sips:remoteaccessportal@carrier.net;tag=xxxxxx
To: sips:homegateway@carrier.net
Call-ID: xxx@carrier.net
CSeq: 1 INVITE
Contact: sips:remoteaccessportal@carrier.net>
Content-Type: application/sdp
Content-Length: yyy
─────────────────────────────────────────
(*BLANK LINE)
       <*SUBSEQUENT PORTION IS SDP FORMAT EXPANDED PORTION MADE
        BASED UPON PRESENT INVENTION>
  - CLIENT IP ADDRESS
  - NAT IP ADDRESS
  - PREVIOUS COMMON KEY (COMMUNICATION KEY)
```

VPN SETTING REQUEST MESSAGE (SIPS)

FIG. 7

```
SIP/2.0 200 OK
Via:SIP/2.0/TLS remoteaccessportal@carrier.net;branch=z9hG4bkxxxxxx
From: sips:remoteaccessportal@carrier.net;tag=xxxxxx
To:sips:remoteaccessportal@carrier.net;tag=yyyyyy
Call-ID:xxx@carrier.net
CSeq:1 INVITE
Contact:sips:homegateway@carrier.net
Content-Type:application/sdp
Content-Length:yyy (*BLANK LINE)
―――――<*SUBSEQUENT PORTION IS SDP FORMAT EXPANDED PORTION MADE
            BASED UPON PRESENT INVENTION> ―――――
     PREVIOUS COMMON KEY (COMMUNICATION KEY)
```

VPN SETTING REQUEST RESPONSE MESSAGE (SIPS)

FIG. 8

```
HTTP1.1 200 OK
DATE:xxxxxx
SERVER:xxx/yyy
Content-Type: text/html
CONTENT-Length:xxx
*GATEWAY IP ADDRESS, PREVIOUS COMMON KEY (COMMUNICATION KEY)*
```

RESPONSE MESSAGE (HTTPS)

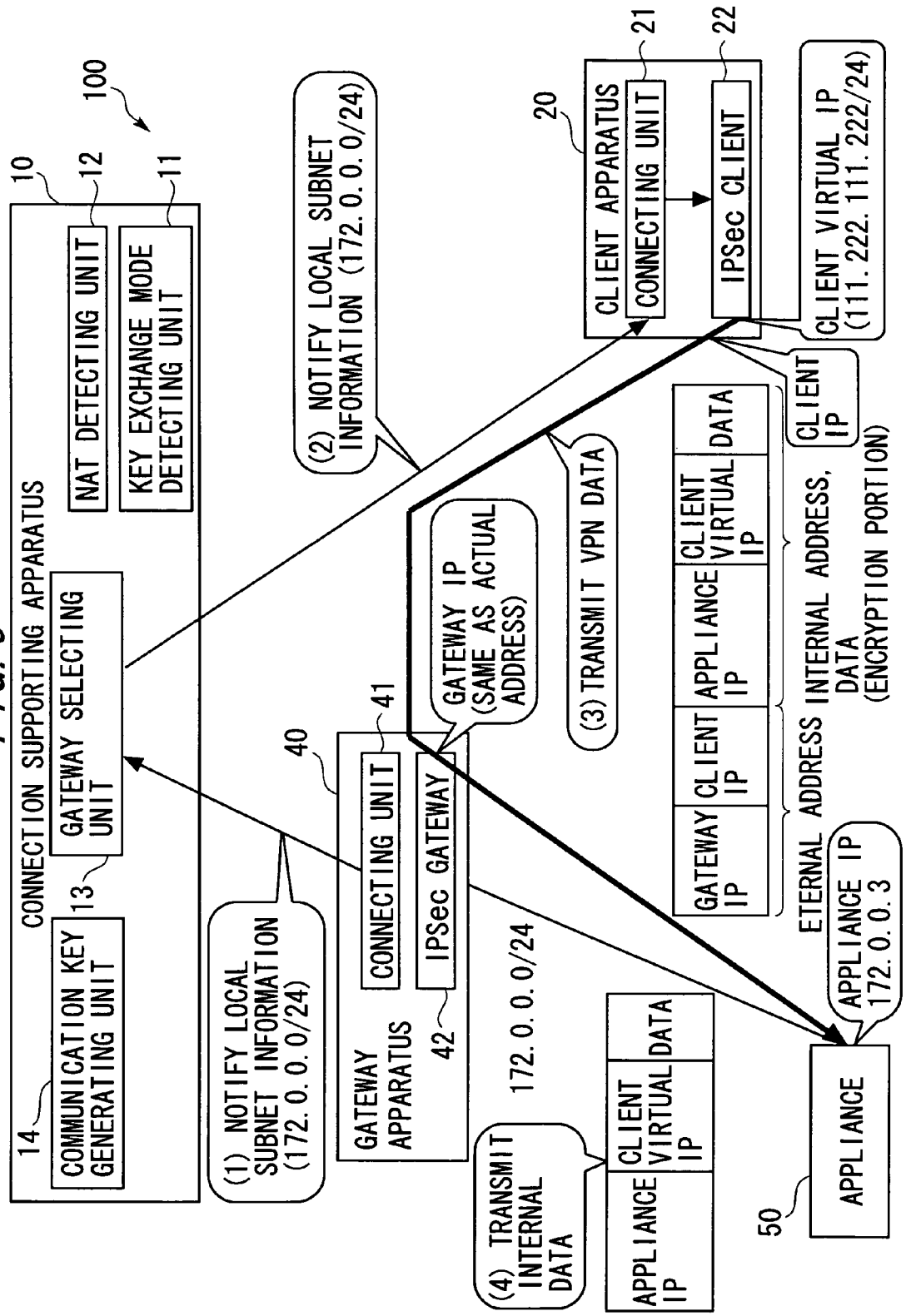

FIG. 10

```
SIP/2.0 200 OK
Via: SIP/2.0/TLS remoteaccessportal@carrier.net;branch=z9hG4bkxxxxxx
From: sips:remoteaccessportal@carrier.net;tag=xxxxx
To: sips:homegateway@carrier.net;tag=yyyyy
Call-ID: xxx@carrier.net
CSeq:1 INVITE
Contact: sips:homegateway@carrier.net
Content-Type: application/sdp
Content-Length: yyy (*BLANK LINE)
              <*SUBSEQUENT PORTION IS SDP FORMAT EXPANDED PORTION MADE
               BASED UPON PRESENT INVENTION>
 - PREVIOUS COMMON KEY (COMMUNICATION KEY)
 - LOCAL SUBNET ADDRESS
```

VPN SETTING REQUEST RESPONSE MESSAGE (SIPS)

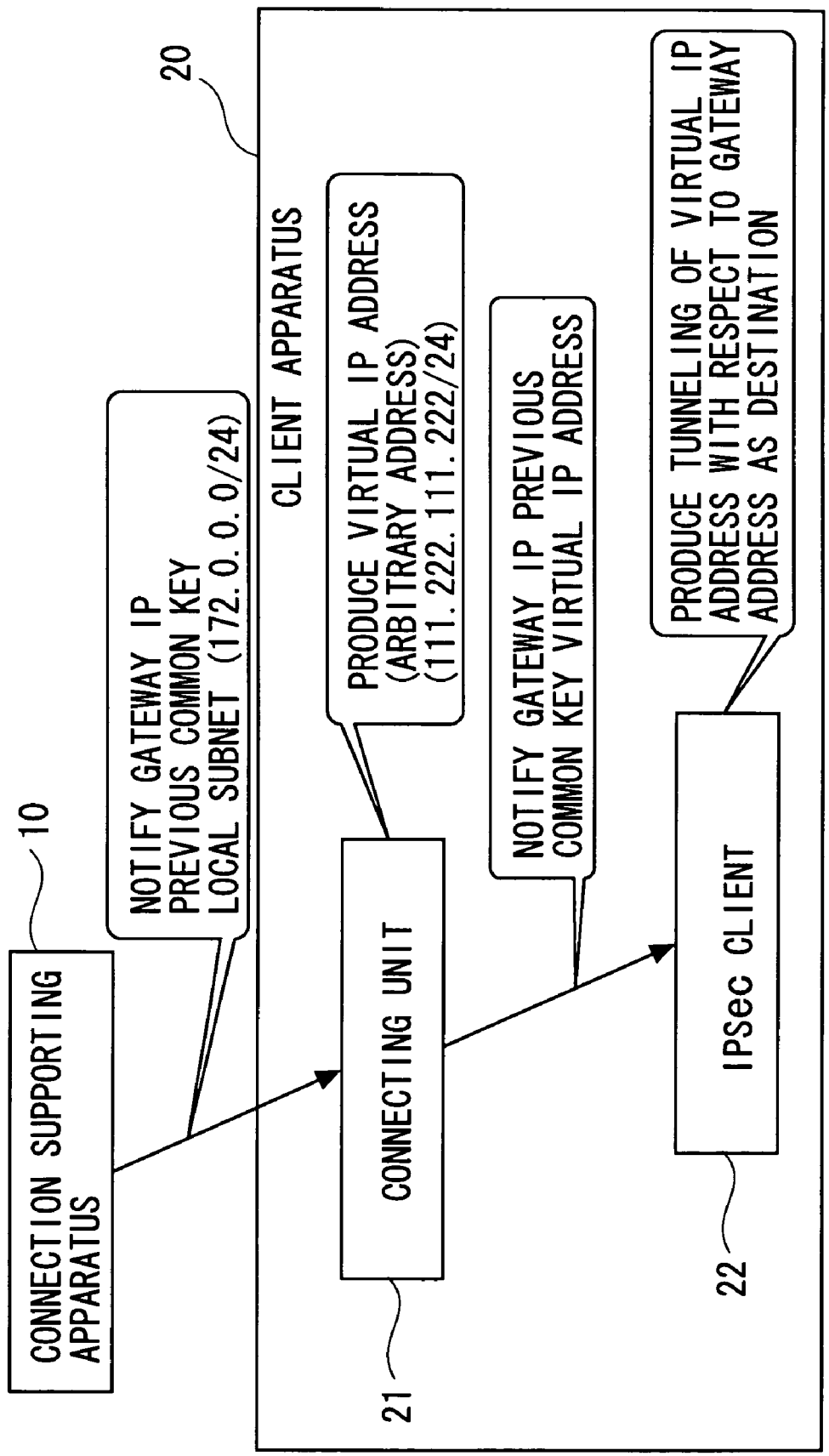

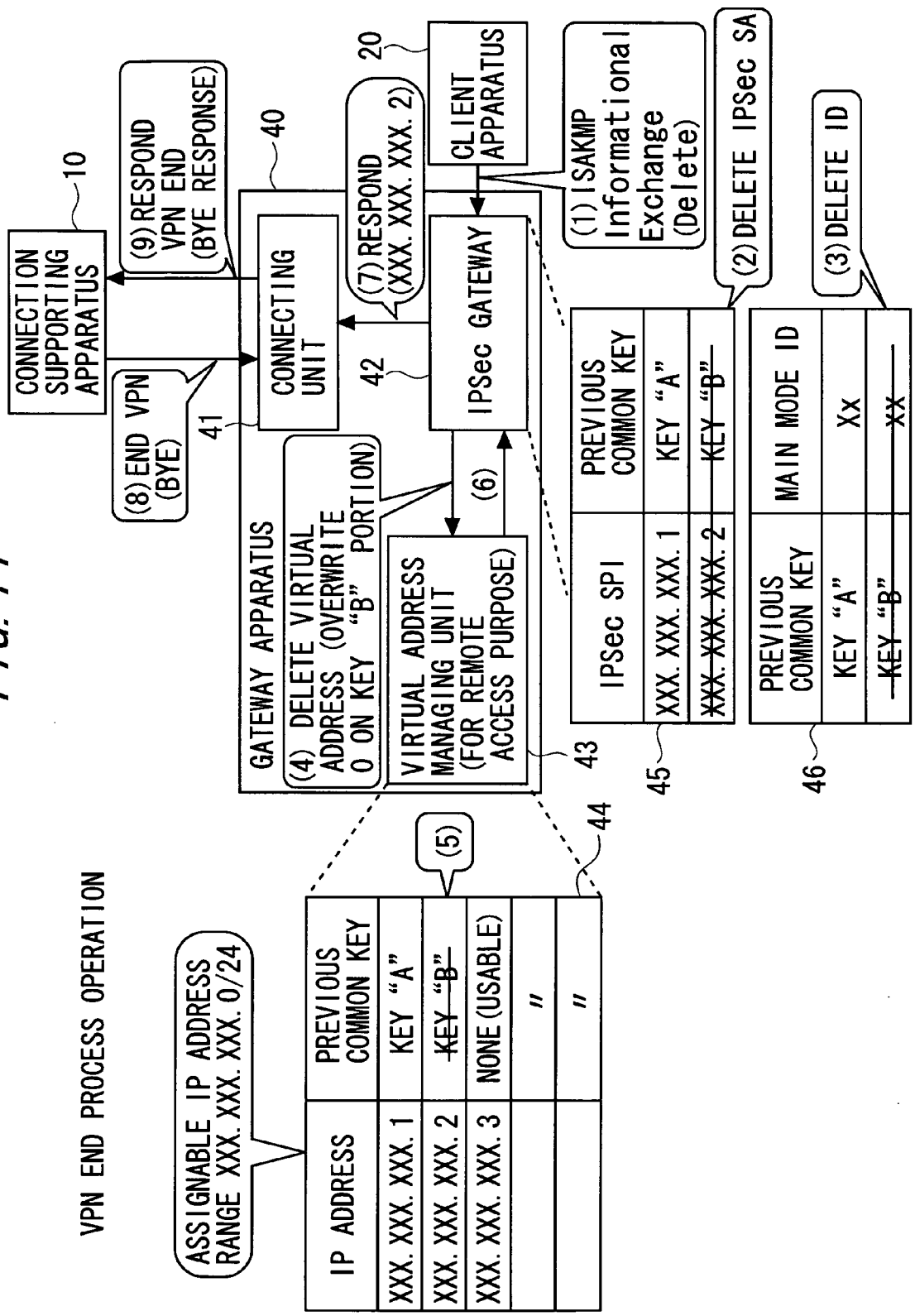

FIG. 15

```
BYE sips:remoteaccessportal@carrier.net SIP/2.0
Via: SIP/2.0/TLS homegateway@carrier.net;branch=z9hG4bKxxxxxx
Max-Forwards: 70
From: sips:homegateway@ carrier.net; tag=yyyyy
To: sips:remoteaccessportal@carrier.net;tag=xxxxx
CALL-ID: xxx@carrier.net
CSeq: XXX BYE
Content-Type: application/ sdp //  ←* THIS IS NOT PRESENT IN ORIGINAL SIP BYE MESSAGE
Content-Length:yyy //  ←* THIS LENGTH IS "0" IN ORIGINAL SIP BYE MESSAGE
————<* ADDED SDP EXPANDED PORTION>————
- PREVIOUS COMMON KEY
```

VPN END MESSAGE (SIPS BYE)

FIG. 16

```
SIP/2.0 200 OK
Via: SIP/2.0/TLS
homegateway@carrier.net;branch=z9hG4bKxxxxxx
From: sips:homegateway@carrier.net; tag=yyyyyy
To: sips:remoteaccessportal@carrier.net;tag=xxxxxx
CALL-ID: xxx@carrier.net
CSeq: XXX BYE
Content-Length: 0
```

VPN END RESPONSE MESSAGE (SIPS BYE RESPONSE)

CONNECTION SUPPORTING APPARATUS

BACKGROUND OF THE INVENTION

1. Field of the Invention

The present invention relates to an apparatus or appliance such as client apparatus or gateway apparatus, which is equipped with an IPSec (IP Security Protocol) function, remote-accesses a remote network in a safe manner under various network environments.

2. Description of the Related Art

As an example of an Internet key exchange protocol utilized in IPSec, there is an IKE (Internet Key Exchange). The IKE negotiates with a communication counterpart on parameters which are required for setting IPSec SA (IPSec security association), and then, sets the obtained values to a system.

The protocol of the IKE is divided into two phases, namely; a "phase 1" and a "phase 2". In the phase 1, an SA (Security Association, called "Internet Security Association and Key Management Protocol (ISAKMP) SA") is established, which is employed so as to establish a safe communication path through which messages of the IKE itself are transmitted and received. In the phase 1, keys used to encrypt the messages of the IKE and the IKE itself are authenticated. In the phase 2, the parameters of the authentication and the encryption used in communication of the IPSec are exchanged by using the ISAKMP SA (IKE SA) established in the phase 1, and finally, the IPSec SA is established.

In the phase 1, there are two modes, namely, a "main mode" and an "aggressive mode", and one of these modes is used in the phase 1. In the main mode, since six messages in total are exchanged, the ISAKMP SA is established. In contrast, the ISAKMP SA is established in the aggressive mode by exchanging three messages, which is less than that of the main mode.

When the remote access is made from a client to a gateway in the IPSec, the aggressive mode is generally employed. However, in the aggressive mode, identification information (ID (authentication ID): for example, electronic mail address, FQDN (Fully Qualified Domain Name) etc.) is previously registered in both the gateway and the client, while the identification information is employed in the authentication of the IKE. The ID is transmitted and/or received between the gateway and the client at a time of authentication of the ID under a plain text (no-encryption) state. As a result, there has been a risk that the ID is leaked to a third party.

For instance, there has been a case where the ID and a fixed gateway address corresponding to this ID are intercepted by the third party in a communication area of a wireless LAN (Radio Local Area Network) such as a public hot spot and a hotel, which does not require a WEP (Wired Equivalent Privacy) key to be set. In this case, there has been a risk of the third party externally attacking the gateway and the client by way of, for example, a replay attack or a scan attack.

In a case where there is an administrator of the gateway with respect to the external attack, there is a possibility of the administrator detecting the scan attack and the like and taking a countermeasure the attacks. However, as to the remote access to a home network where the administrator having expert knowledge is not present, there has been a risk that attacks are given from the third party due to weakness of the system.

On the other hand, in the main mode, when an ID is authenticated, the ID is encrypted by a common key produced in the phase 1. As a result, there is no problem of ID leakage in the aggressive mode. Apparently, in the main mode, unlike the aggressive mode, a fixed IP address is employed as an ID for authenticating the client. As a consequence, the main mode is mainly employed in point-to-point connections, for example, communications between nodes having global IP addresses on the Internet where the IP addresses are not changed.

Also, as prior art related to the present invention, there is proposed a method in which terminal management information in management servers utilized in Mobile IP is combined with VPN (Virtual Private Network) path information on networks, and VPN paths through which the management servers transmit data to the clients are switched to a seamless manner in conformation to movement of the clients (for example, Patent document 1).

[Patent document 1] JP 2002-111732 A
[Patent document 2] JP 2002-44141 A

SUMMARY OF THE INVENTION

An object of the present invention is to provide a technique with which an application range of a main mode having a higher security level than that of an aggressive mode can be expanded.

The present invention employs the following means in order to solve the problems described above.

In other words, according to a first aspect of the present invention, there is provided A connection supporting apparatus for supporting a Virtual Private Network (VPN) through an Internet Key Exchange (IKE) between a first apparatus and a second apparatus, including: a mode judging unit to receive authentication information of the first apparatus employed in the IKE, and to judge whether or not a key exchange mode of the first apparatus is a main mode based on the authentication information; a VPN setting request transmitting unit to transmit a VPN setting request to the second apparatus in the case where the key exchange mode of the first apparatus is the main mode, the VPN setting request containing the authentication information and information as to a communication key to be used when the first apparatus executes the IKE with respect to the second apparatus; and a notifying unit to notify both the communication key and an Internet Protocol (IP) address of the second apparatus to the first apparatus in the case where the notifying unit receives a response with respect to the VPN setting request from the second apparatus.

Preferably, according to the first aspect of the present invention, the connection supporting apparatus, further including: a judging unit to judge whether or not an IP address converting apparatus is interposed between the connection supporting apparatus and the first apparatus based on the authentication information and a source IP address of an IP packet when the judging unit receives the IP packet containing the authentication information of the first apparatus, wherein when the IP address converting apparatus is interposed therebetween, the VPN setting request transmitting unit transmits a VPN setting request which further contains the source IP address of the IP packet to the second apparatus.

Preferably, according to the first aspect of the present invention, when the key exchange mode of the first apparatus is the main mode, a list of a plurality of second apparatuses is transmitted to the first apparatus, and when a return containing information indicative of one of the plurality of second apparatuses determined by the first apparatus is received, the VPN setting request transmitting unit transmits the VPN setting request to one of the plurality of second apparatus.

Preferably, according to the first aspect of the present invention, in the case where a response of the VPN setting request containing information as to a subnet address to which a communication counterpart of the first apparatus accommodated in the second apparatus belongs is received from the second apparatus, the notifying unit notifies the information as to the subnet address to the first apparatus.

Preferably, according to the first aspect of the present invention, in the case where a response of the VPN setting request containing an IP address to be assigned to the first apparatus is received from the second apparatus, the notifying unit notifies the IP address to the first apparatus.

According to a second aspect of the present invention, a client apparatus including: a connecting unit to transmit a message containing an Internet Protocol (IP) address of the client apparatus as authentication information for the client apparatus used in the IKE to a connection supporting apparatus when establishing a VPN through an Internet Key Exchange (IKE) between the client apparatus and a gateway apparatus is desired, and to receive a response message from the connection supporting apparatus, the message containing a communication key to be used in the IKE and an IP address of the gateway apparatus; and a VPN processing unit to execute the IKE to establish between the client apparatus and the gateway apparatus by employing the communication key, the IP address of the gateway apparatus, and the authentication information of the client apparatus.

Preferably, according to the second aspect of the present invention, in the case where information as to a subnet address to which a communication counterpart of the client apparatus stored in the gateway apparatus belongs is contained in the response message, a virtual IP address is generated which is not competed with the subnet address, and the virtual IP address is set to a source IP address of an IP packet which is encapsulated in a VPN communication operation after the VPN is established.

According to a third aspect of the present invention, a gateway apparatus including: a connecting unit to receive a VPN setting request message from a connection supporting apparatus, and to transmit a response message with respect to the received VPN setting request message to the connection supporting apparatus, the VPN setting request message containing both a communication key to be used in an IKE (Internet Key Exchange), and an IP address of a client apparatus according to authentication information of the client apparatus which wants to establish a VPN through the IKE with respect to the own apparatus; and a VPN processing unit for establishing the VPN through the IKE with respect to the client apparatus by employing the communication key and the IP address of the client apparatus serving as the authentication information.

Preferably, according to the third aspect of the present invention, the connecting unit returns to the connection supporting apparatus, the response message containing a subnet address to which a communication counterpart of the client apparatus accommodated in the gateway apparatus belongs.

Preferably, according to the third aspect of the present invention, when the gateway apparatus receives the VPN setting request message, a virtual IP address is determined which should be assigned to the client apparatus, and the connecting unit returns the response message containing the determined virtual IP address to the connection supporting apparatus.

According to the present invention, an application range of a main mode having a higher security level than that of an aggressive mode can be expanded.

BRIEF DESCRIPTION OF THE DRAWINGS

FIG. 6 is an explanatory diagram of a format example as to a VPN setting request message;

FIG. 7 is an explanatory diagram of a format example as to a VPN setting request response message;

FIG. 8 is an explanatory diagram of a format example as to a response message to the client apparatus;

FIG. 9 is an explanatory diagram of a structural example and an operational example as to a connection supporting system according to a second embodiment;

FIG. 10 is an explanatory diagram of a VPN setting request response message according to the second embodiment;

FIG. 11 is an explanatory diagram of a client apparatus according to the second embodiment;

FIG. 14 is an explanatory diagram of a VPN end process operation according to the third embodiment;

FIG. 15 is an explanatory diagram of a VPN end message according to the third embodiment; and FIG. 16 is an explanatory diagram of a VPN end response message according to the third embodiment.

DETAILED DESCRIPTION OF THE PREFERRED EMBODIMENT

First Embodiment

<Structure>

Figure 1:
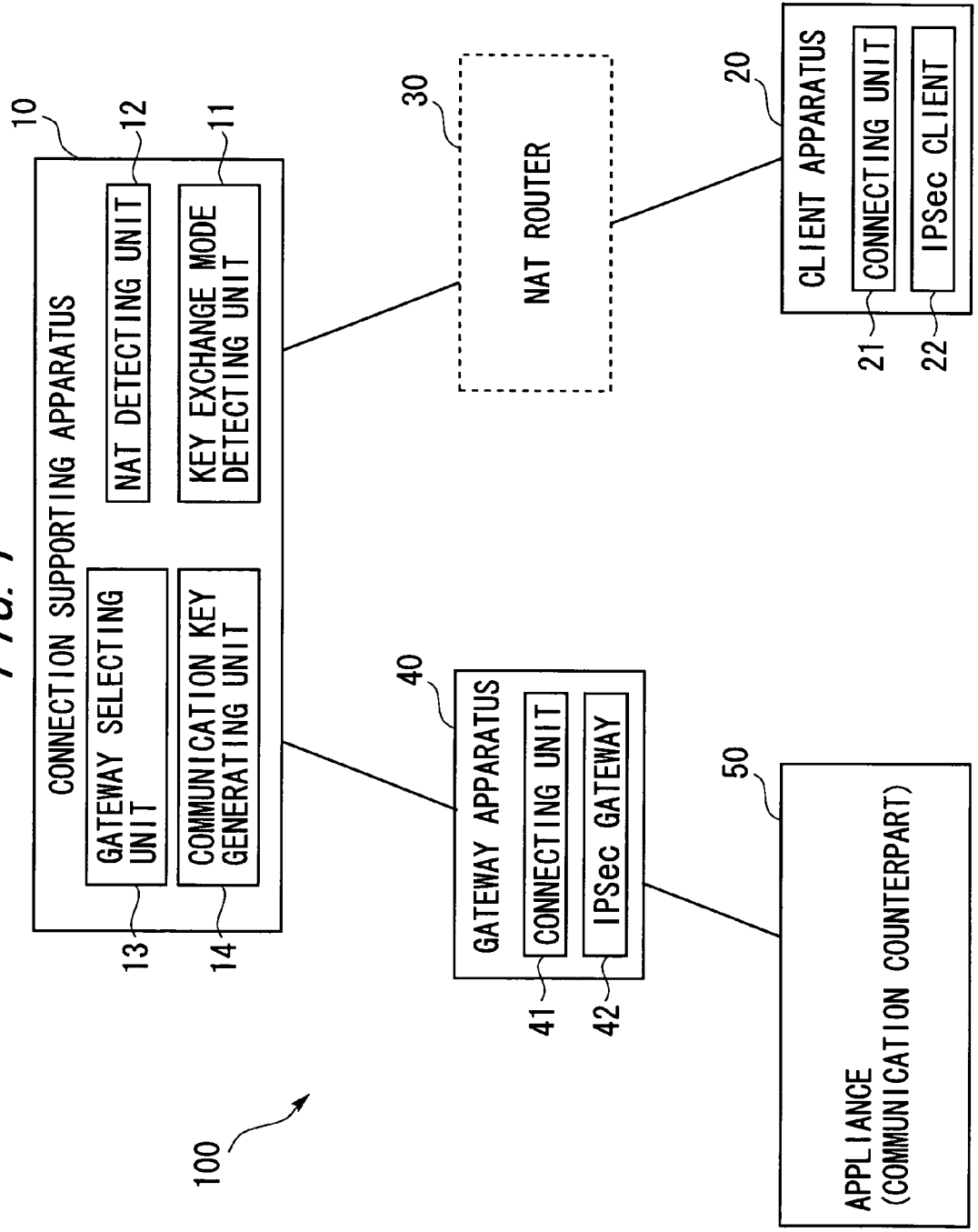
FIG. 1 is a diagram for indicating a structural example of a connection supporting system according to an embodiment of the present invention.

FIG. 1 is a diagram for showing a structural example of a connection supporting system according to an embodiment of the present invention. In FIG. 1, a connection supporting system 100 is equipped with a client apparatus 20 serving as a first apparatus, a gateway apparatus 40 serving as a second apparatus, an appliance 50, a connection supporting apparatus 10, and a NAT router (IP address converting apparatus) 30. The gateway apparatus 40 performs a VPN communication with the client apparatus 20 using an IPSec. The appliance 50 is directly connected to the gateway apparatus 40 and becomes a communication counterpart of the client apparatus 20. The connection supporting apparatus 10 supports a VPN connection between the client apparatus 20 and the gateway apparatus 40. The NAT router 30 is interposed between the connection supporting apparatus 10 and the client apparatus 30. It should be noted that a communication path between the connection supporting apparatus 10 and the client apparatus 20 may contain a wireless section.

The client apparatus 20 is a computer (terminal apparatus) such as a personal computer (PC) and a PDA (Personal Digital Assistant), and is equipped with a connecting unit 21 and an IPSec client 22 serving as a VPN processing unit. An IKE is installed in the client apparatus 10 as a key exchange protocol, the client apparatus 20 establishes a VPN tunnel with respect to the gateway apparatus 40 by employing the IPSec in the main mode, and performs an encryption communication using this VPN tunnel.

The connecting unit 21 communicates with the connection supporting apparatus 10 so as to acquire information required for establishing a VPN tunnel based upon IPSec with an IPSec gateway 42 of the gateway apparatus 40 by the IPSec client 22 from the connection supporting apparatus 10, and then, sets the acquired information to the IPSec client 22.

The IPSec client 22 executes the IKE (phase 1 and phase 2) with respect to the gateway apparatus 40 by employing the information set by the connecting unit 21, and establishes an IPSec SA with respect to the gateway apparatus 40.

The NAT router 30 has a general-purpose NAT function (NAPT). In other words, the NAT router 30 performs a converting process operation of an IP address (namely, local IP address-to-global IP address converting process operation) which is applied to an IP packet transferred between the client apparatus 20 and the connection supporting apparatus 10. In this case, a local IP address is temporarily assigned to the client apparatus 20 by a DHCP server (not shown).

The connection supporting apparatus 10 is equipped with a key exchange mode detecting unit 11 serving as a mode judging unit, a NAT detecting unit 12 serving as a judging unit, a gateway selecting unit 13, and a communication key generating unit 14. The key exchange mode detecting unit 11 judges whether or not a mode in the IKE phase 1 is the main mode based upon an ID for IKE authentication which is contained in an IP packet that arrives from the client apparatus 20 via the NAT router 30.

The NAT detecting unit 12 judges whether or not the NAT router 30 is interposed between the connection supporting apparatus 10 and the client apparatus 20 based upon a transmission source IP address of an IP packet, and an ID contained in the IP packet.

The gateway selecting unit 13 has information (gateway list) of a plurality of gateway apparatuses (only gateway apparatus 40 is illustrated in FIG. 1) which are connectable with the client apparatus 20 in a storage apparatus. The gateway selecting unit 13 provides the gateway list to the client apparatus 20 in order that the client apparatus 20 selects a gateway apparatus of a connection destination.

When a key exchange mode is the main mode, the communication key generating unit 14 produces a communication key (previous common key: common key different from the previous common key produced by IKE) which is used to encrypt the communication by the IKE, which is executed between the client apparatus 120 and the gateway apparatus 40.

The gateway apparatus 40 contains a connecting unit 41 and an IPSec gateway 42 serving as a VPN processing unit. The connecting unit 41 communicates with the connection supporting apparatus 10 so as to acquire information required in IKE with respect to the client apparatus 20, and sets the acquired information to the IPSec gateway 42.

IPSec gateway 42 functions as a responder with respect to the IPSec client 22 (initiator) of the client apparatus 20 by employing the information set by the connecting unit 41, and thus, establishes an IPSec SA via the IKE phases 1 and 2 so as to establish a VPN tunnel.

When the VPN tunnel is established, the client apparatus 20 communicates with the appliance 50 accommodated in the gateway apparatus 40 by employing the VPN tunnel established between the gateway apparatus 40 and the client apparatus 20. At this time, encryption communication is carried out by way of the IPSec between the client apparatus 20 and the gateway apparatus 40.

<Process Operation of Connection Supporting Apparatus>

Figure 2:
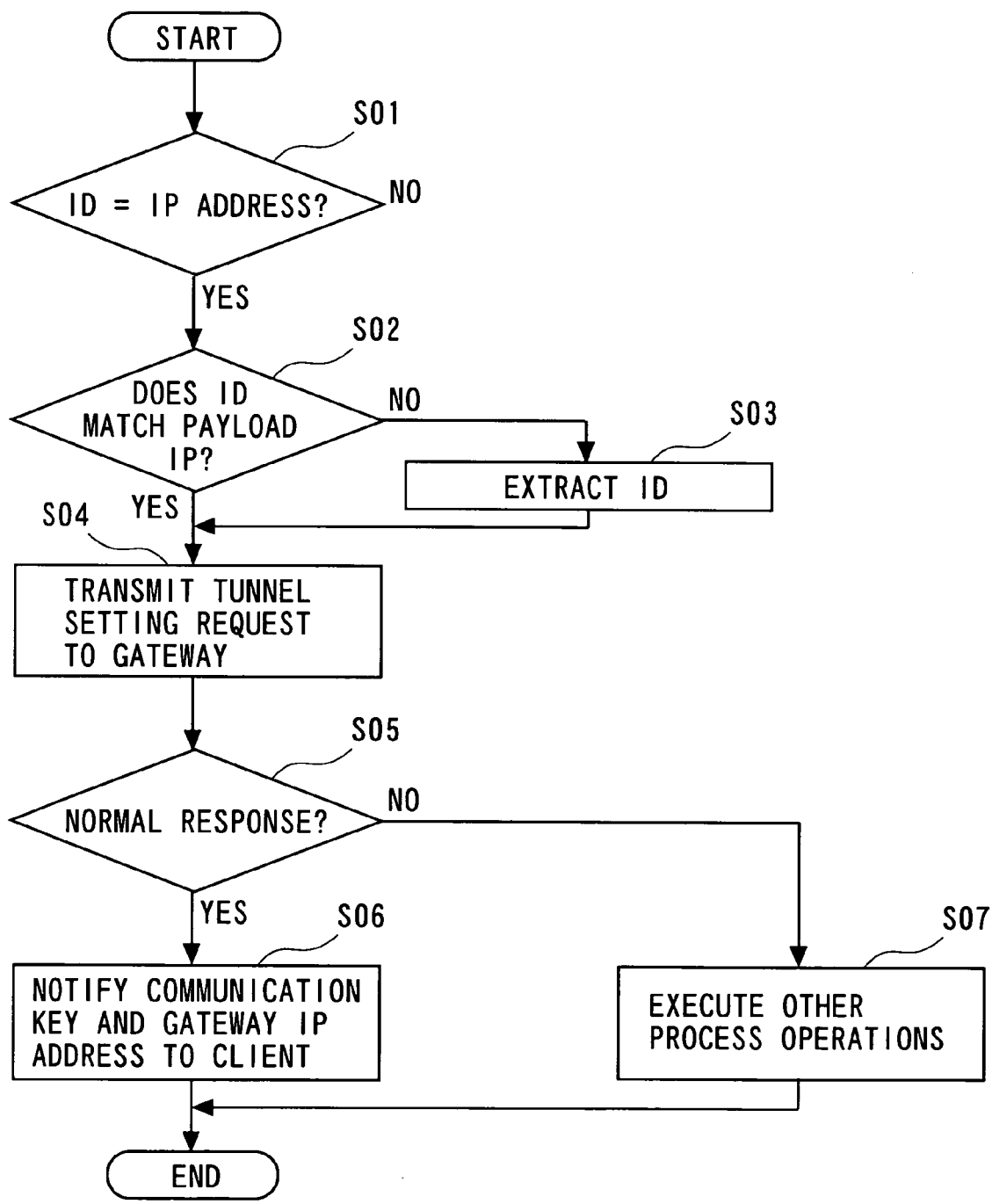
FIG. 2 is a diagram for explaining an example as to a process flow of the connection supporting apparatus shown in FIG. 1.

FIG. 2 shows an example of a process operation flow which is executed by the connection supporting apparatus 10. The process operation shown in FIG. 2 is commenced when the connection supporting apparatus 10 receives data (IP packet containing a message in payload) from the client apparatus 20 via the NAT router 30.

In the connection supporting apparatus 10, the key exchange mode detecting unit 11 first refers to a predetermined position in the message from the client apparatus 20, and judges whether or not an IKE authentication ID stored at the predetermined position is an IP address (Step S01).

That is, the key exchange mode detecting unit 11 judges whether or not data stored as the ID has the format of the IP address. When the ID is an IP address (S01: YES), the key exchange mode detecting unit 11 judges that the key exchange mode of the IKE phase 1 is the main mode, and advances to the process operation of Step S02.

On the contrary, when the ID is not the IP address (S01: NO), the connection supporting apparatus 10 executes another process operation (Step S07). For instance, assuming that the key exchange mode is the aggressive mode, the connection supporting apparatus 10 supports a VPN connection using the aggressive mode. Alternatively, the connection supporting apparatus 10 may execute a predetermined error process operation.

In Step S02, the NAT detecting unit 12 of the connection supporting apparatus 10 compares a transmission source IP address contained in an IP header in the IP packet from the client apparatus 20 with the IP address stored as the ID in the IP payload, and judges whether or not both IP addresses match each other. When these IP addresses match each other (S02: YES), the NAT detecting unit 12 judges that no NAPT (NAT router 30) is interposed between the client apparatus 20 and the connection supporting apparatus 10, and the process operation advances to Step S04.

On the contrary, when the IP addresses do not match each other (S02: NO), the NAT detecting unit 12 judges that the NAPT (NAT router 30) is interposed between the client apparatus 20 and the connection supporting apparatus 10. In this case, the ID is extracted from the IP packet (Step S03), and the process operation advances to Step S04. The ID is extracted to be notified as the local IP address of the client apparatus 20 to the gateway apparatus 40.

In Step S04, the gateway selecting unit 13 of the connection supporting apparatus 10 inquires the client apparatus 20 about a gateway of a connection destination. Upon receipt of response designating a gateway apparatus of the connection destination from the client apparatus 20, the connection supporting apparatus 10 produces a communication key to be used in the IKE between the client apparatus 20 and the gateway apparatus 40 in the communication key generating unit 14. The communication key generating unit 41 may acquire a communication key stored at a place other than itself.

The connection supporting apparatus 10 produces a transparency setting request (VPN setting request message) for IPSec data containing a communication key or the like, and transmits the produced request to the gateway apparatus of the connection destination (gateway apparatus 40 in FIG. 1).

When a proper response (VPN setting request response message) to the VPN setting request message is received from the gateway apparatus 40 (Step S05: YES), the connection supporting apparatus 10 notifies the communication key and the gateway address (IP address of the gateway apparatus 40) to the client apparatus 10 (Step S06).

On the contrary, when the proper VPN setting request response message cannot be received from the gateway apparatus 40 (S05: NO), another process operation (e.g., predetermined error process operation) is executed (Step S07). When the process operation of Step S06 or S07 is finished, the connection supporting apparatus 10 accomplishes the process operations shown in FIG. 1.

In the client apparatus 20, the connecting unit 21 sets the communication key and the gateway address notified by the connection supporting apparatus 10 in the IPSec client 22. Using the communication key and the gateway address, the IPSec client 22 executes communication operations (phases 1 and 2) with the IPSec gateway 42 of the gateway apparatus 40 based on the IKE, and establishes VPN (IPSec SA) using IPSec between the client apparatus 20 and the gateway apparatus 40. In parameter negotiation or key information exchange (DH key material exchange) in the phase 1, encryption communication is executed using the communication keys (previous common keys) respectively set in the IPSec client 22 and the IPSec gateway 42.

After that, when a VPN tunnel is established between the client apparatus 20 and the gateway apparatus 40, the encryption communication is executed between the client apparatus 20 and the gateway apparatus 40 using the VPN tunnel, and a communication operation is carried out via the gateway apparatus 40 between the client apparatus 20 and the appliance 50.

Figure 3:
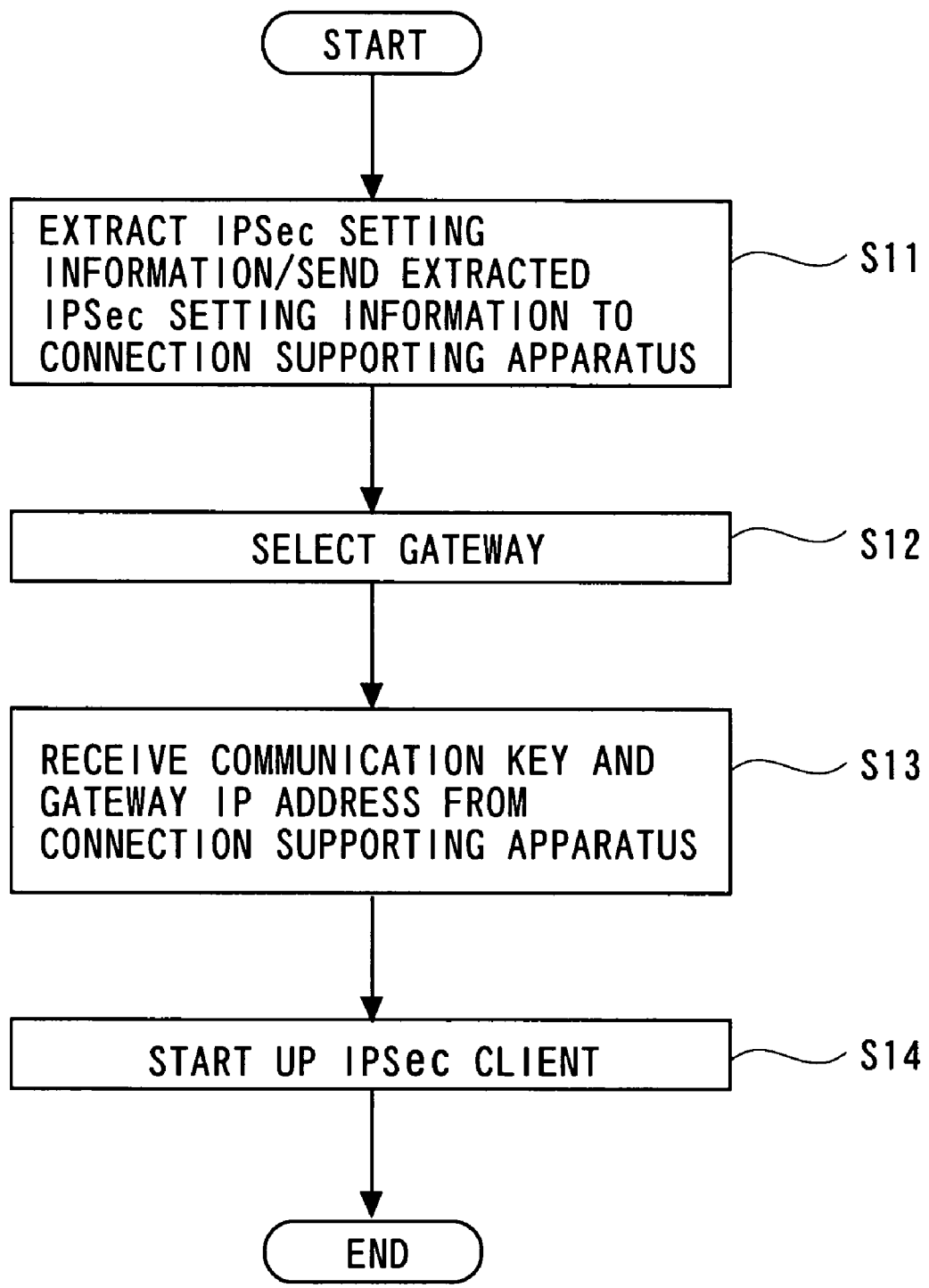
FIG. 3 is a diagram for explaining an example as to a process flow of a client apparatus shown in FIG. 3.

FIG. 3 shows an example of a process operation flow of the client apparatus 20. The process operations shown in FIG. 3 are commenced when the client apparatus 20 starts a communication operation with the appliance 50. When the process operations shown in FIG. 3 is commenced, the connecting unit 21 of the client apparatus 20 extracts key exchange information based on the key exchange mode (ID=xxx.xxx.xxx.xxx based on the IKE main mode, i.e., the IP address of the client apparatus 20 (equivalent to "authentication information" of the present invention) from the IPSec setting information stored in the storage apparatus composing the IPSec client 22, and transmits the key exchange information to the connection supporting apparatus 10 (Step S11).

Next, the connecting unit 21 of the client apparatus 20 receives gateway information (list of gateway apparatuses to which client apparatus 20 is connectable: gateway list) notified by the gateway selecting unit 13 of the connection supporting apparatus 10, and selects a gateway apparatus (Step S12).

For example, the gateway list is displayed on a display apparatus (not shown) of the client apparatus 20. The user of the client apparatus 20 can input the selection result of the gateway apparatus to which the user intends to connect from the gateway list using an input apparatus (not shown) of the client apparatus 20. The connecting unit 21 transmits the selection result to the connection supporting apparatus 10 as a response to the inquiry from the connection supporting apparatus 10.

After that, the connecting unit 21 of the client apparatus 20 receives the communication key and the gateway IP address, which are notified by the connection supporting apparatus 10 (Step S13). As a result, the connecting unit 21 sets the communication key and the gateway IP address in the IPSec client 22, and activates the IPSec client 22. Accordingly, the IPSec client executes the IKE with the IPSec gateway 42 of the gateway apparatus 40, and communicates therewith so as to establish the IPSec SA, whereby a VPN tunnel is established. Using this VPN tunnel, the client apparatus 20 can execute encryption communication with the gateway apparatus 40, which relays data (IP packet) to be exchanged between the appliance 50 and the client apparatus 20. The client apparatus 20 and the appliance 50 can communicate with each other in this manner.

First Operational Example

Figure 4:
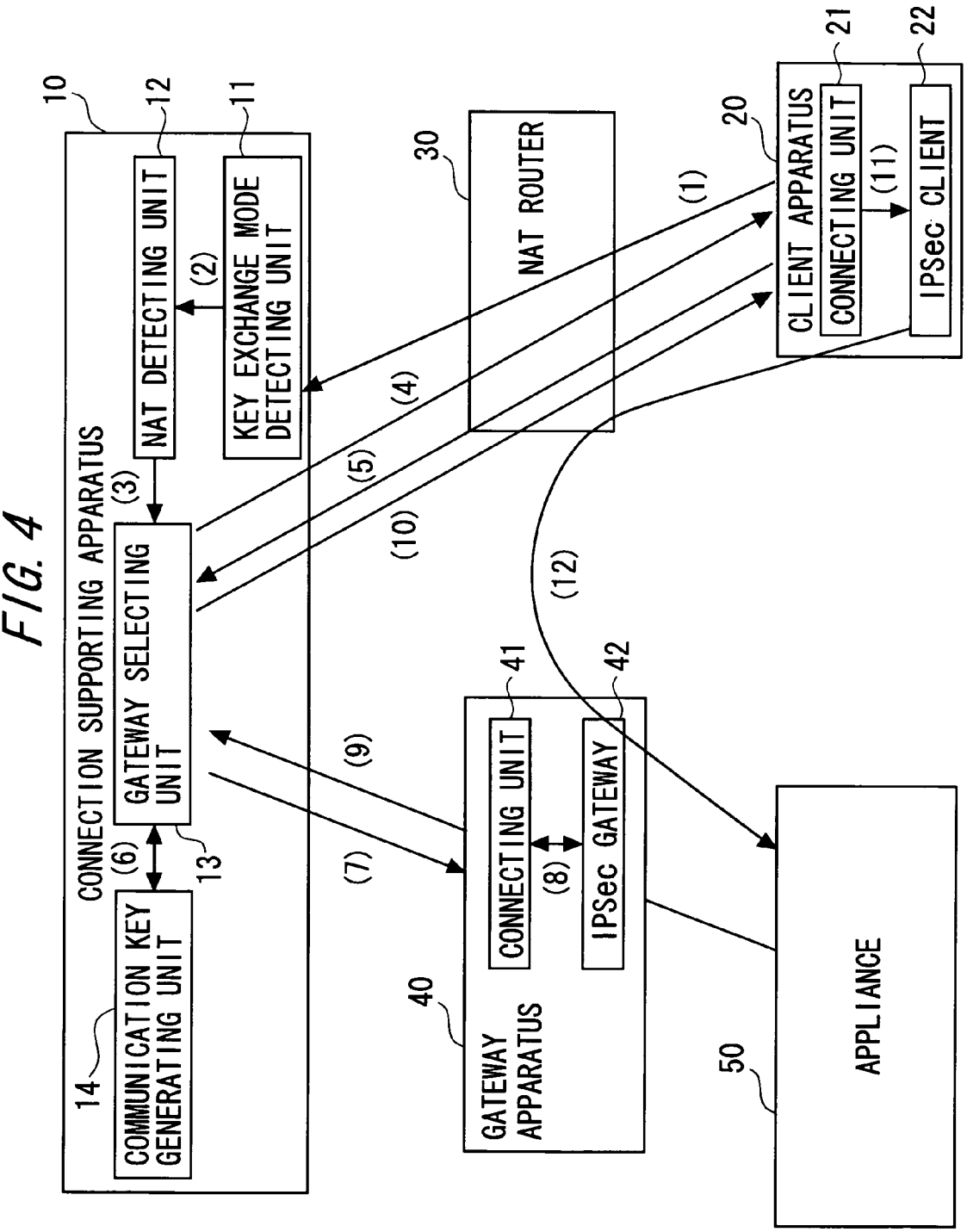
FIG. 4 is an explanatory diagram of first operational example of the first embodiment, and of operations as to remote access support (NAT present) of a main mode.

Next, as a first operational example in the connection supporting system, a description will be made of a case where the connection supporting apparatus 10 performs IKE main mode remote access supporting operation. In the first operational example, the NAT (NAT router 30) is interposed between the client apparatus 20 and the connection supporting apparatus 10. FIG. 4 is an explanatory diagram for explaining the first operational example (remote access supporting operation (NAT present) in main mode).

In FIG. 4, the client apparatus 20 which intends to communicate with the appliance 50 produces an IP packet having a message containing client key exchange information (ID) using the connecting unit 21, and transmits the IP packet to the connection supporting apparatus 10 ((1) in FIG. 4). The IP address (local IP address: client IP address) of the client apparatus 20 is set as the ID (refer to FIG. 5A). In the first embodiment, the client apparatus 20 performs an IP communication operation using a local IP address assigned by a DHCP server (not shown).

The IP packet is received by the connection supporting apparatus 10 through the NAT router 30. The NAT router 30 rewrites the transmission source IP address (client IP address) of the IP packet to a global IP address (NAT IP address) (refer to FIG. 5B).

When the connection supporting apparatus 10 receives the IP packet, the key exchange mode detecting unit 11 refers to an ID storage field contained in the message. When the key exchange mode detecting unit 11 detects that data stored in the ID storage field has the format of the IP address, it is judged (detected) that the IKE phase 1 is the main mode. The key exchange mode detecting unit 11 hands over the IP packet to the NAT detecting unit 12 ((2) in FIG. 4).

The NAT detecting unit 12 compares the IP address stored as the ID with the transmission source IP address in the IP packet. Since the IP address as the ID is the client IP address and the transmission source IP address is the NAT IP address, both addresses do not match each other. As a result, the NAT detecting unit 12 detects that the NAT router 30 is interposed between the connection supporting apparatus 10 and the client apparatus 20.

After that, the NAT detecting unit 12 hands over the IP packet (IKE message) to the gateway selecting unit 13 ((3) in FIG. 4). At this time, the ID is extracted from the IP packet.

The gateway selecting unit 13 reads the gateway list from the storage apparatus and transmits the IP packet (transmission source IP address: connection supporting apparatus, destination IP address: NAT IP) containing the gateway list to the client apparatus 20 ((4) in FIG. 4). The destination IP address of the IP packet is rewritten from the NAT IP address to the client IP address when passing through the NAT router 30.

When the client apparatus 20 receives the IP packet, the client apparatus 20 displays the gateway list on a display apparatus (not shown). The user of the client apparatus 20 inputs the selection result for a desired gateway to be connected to (information as to designated gateway) in the client apparatus 20 via the input apparatus (not shown) by referring to the gateway list. Then, the connecting unit 21 transmits a message (IP packet) containing the information on the designated gateway. This message reaches the connection supporting apparatus 10 through the NAT router 30 ((5) in FIG. 4). It is assumed that the user has selected the gateway apparatus 40 in this case.

Upon receipt of the information on the designated gateway, the gateway selecting unit 13 hands over the received information to the communication key generating unit 14 ((6) in FIG. 4). The communication key generating unit 14 produces a communication key (previous common key) for establishing VPN between the designated gateway (gateway apparatus 40) and the client apparatus 10, and hands over the produced communication key to the gateway selecting unit 13.

The gateway selecting unit 13 produces a VPN setting request message corresponding to the designated gateway, and transmits an IP packet containing the message to the gateway apparatus 40 ((7) in FIG. 4). The IP address of the gateway apparatus 40 contained in the gateway list, for example, is set as the destination IP address of the IP packet.

FIG. 6 is a diagram for showing an example of the format of the VPN setting request message. FIG. 6 shows the VPN setting request message based on the SIP (Session Initiation Protocol). The message contains the format of the SDP (Session Description Protocol) to be used in the SIP. An expanded area is provided in the SDP format portion. The client IP address (ID), the NAT IP address, and the communication key (previous common key) are stored in the expanded area.

The VPN setting request message is received by the connecting unit 41 of the gateway apparatus 40. The connecting unit 41 performs a VPN setting operation to the IPSec gateway 42 based on the VPN setting request message ((8) in FIG. 4). At this time, the client IP address (ID), the NAT IP address, and the communication key (previous common key) are set in the IPSec gateway 42. When the process operation as described above is ended, the connecting unit 41 produces a response message to the VPN setting request message (VPN setting request response message), and transmits the response message to the connection supporting apparatus 10 ((9) in FIG. 4).

FIG. 7 is a diagram for showing an example of the format of the VPN setting request response message. As shown in FIG. 7, the VPN setting request response message has an SIP response message format, and contains an SDP format portion and an expanded portion of the SDP format. The communication key received from the connection supporting apparatus 10 is stored in the expanded portion. The communication key functions as a session ID for indicating that the VPN setting request response message is a response message corresponding to the VPN setting request message. Therefore, it is not essential that the communication key be stored in the response message. The response message only needs to be identified by the connection supporting apparatus 10.

When the gateway selecting unit 13 receives the VPN setting request response message and identifies that the received message is a response message, the gateway selecting unit 13 produces a response message containing the communication key (previous supply key) notified to the gateway apparatus 40 and the IP address (gateway IP address) of the gateway apparatus 40, and transmits the response message to the client apparatus 20 ((10) in FIG. 4).

FIG. 8 is a diagram for showing an example of the format of the response message. In the example, the response message has a format based on HTTP (Hyper Text Transfer Protocol), and contains the communication key (previous common key) and the gateway IP address in the format.

In the client apparatus 20, when the connecting unit receives the response message, IPSec is set in the IPSec client 22 ((11) in FIG. 4). That is, the gateway IP address to which VPN connection is to be established, and the communication key to be used in the IKE phase 1 are set in the IPSec client 22.

As a consequence, the communication key (encryption key) for encrypting a communication operation between the client apparatus 20 and the gateway apparatus 40 is shared by the client apparatus 20 and the gateway apparatus 40 at the time of start of the IKE phase 1. The communication key is used to encrypt a communication operation between the client apparatus 20 and the gateway apparatus 40 until a common key is produced by DH key exchange (Diffie-Hellman key shared algorithm) and shared in the IKE phase 1.

The IPSec client 22 (initiator) starts an execution of the IKE phase 1 to the IPSec gateway 42 (responder) of the gateway apparatus 40. The phase 1 is executed in the main mode. At this time, the first message exchange (proposition of SA condition and communication for selection) from the IPSec client 22 to the IPSec gateway 42 is encrypted using the communication key. After that, when DH key exchange is executed in the phase 1 and the previous common key is produced between the IPSec client 22 and the IPSec gateway 42, ID authentication (mutual authentication between VPN apparatuses) is executed using the previous common key, ISAKMP SA is established, and the phase 1 is accomplished. Subsequently, the phase 2 is executed between the IPSec client 22 and the IPSec gateway 42, and IPSec SA is established using the ISAKMP SA, whereby a VPN tunnel is established therebetween.

When the VPN tunnel is established, the client apparatus 20 can communicate with the appliance 50 via the gateway apparatus 40.

Second Operational Example

Next, a second operational example of the first embodiment will be described. As the second operational example, a description will be made of an operational example in a case where, different from the connection supporting system 100 shown in FIG. 1, the NAT router 30 is not interposed between the client apparatus 20 and the connection supporting apparatus 10. The client apparatus 20 executes an IP communication operation using a global IP address given from the DHCP server (not shown).

Figure 5A:
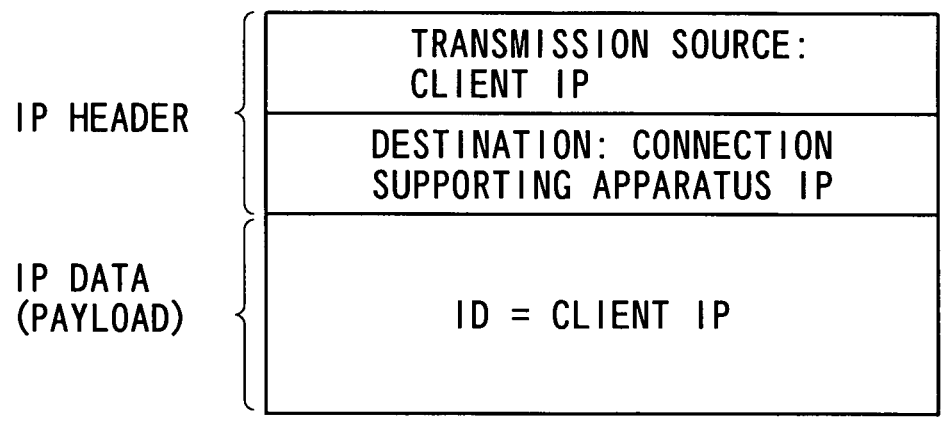
FIG. 5A is a diagram for indicating a format example of a message transmitted from a client to the connection supporting apparatus.
Figure 5B:
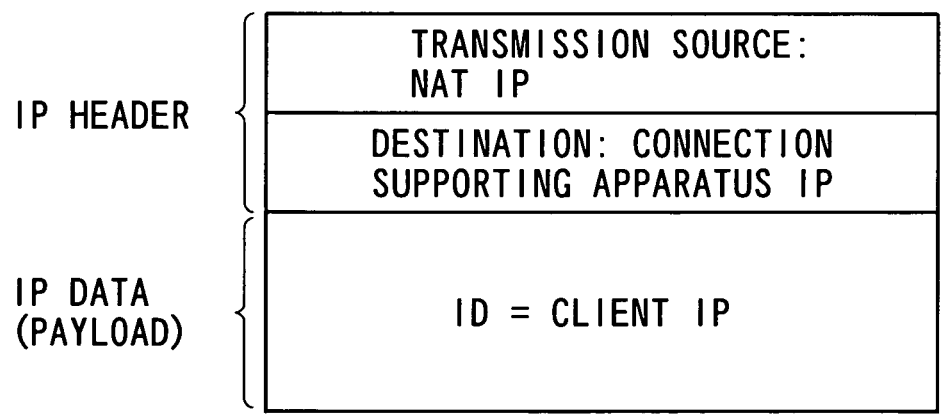
FIG. 5B is a diagram for showing a message shown in FIG. 5A, whose a source IP address is converted by a NAT router (address converting apparatus)

The procedures in the second operational example are substantially the same as those of the first operational example except in the following points. That is, because of the absence of the NAT router 30, the transmission source IP address of the IP packet to be sent to the connection supporting apparatus 10 from the client apparatus 20 is not converted. In other words, the IP packet having the client IP address as shown in FIG. 5A reaches the connection supporting apparatus 10. It should be noted that the client IP address is the global IP address.

In this case, since the transmission source IP address in the header of the IP packet matches the client IP address stored as an ID in the IP data (IP payload), the NAT detecting unit 12 of the connection supporting apparatus 10 judges that no NAT is interposed between the connection supporting apparatus 10 and the client apparatus 20. In this case, it is only necessary to notify the gateway apparatus 40 of the transmission source IP address as the client IP address, so an ID is not extracted unlike in the first operational example.

Since there is no NAT IP address, the gateway selecting unit 13 does not store a NAT IP address in the VPN setting request message to be sent to the designated gateway (e.g., gateway apparatus 40) (NAT IP address is excluded from the message shown in FIG. 6).

The second operational example is similar to the first operational example except for the points described above, so description thereof will be omitted.

Functions and Effects of First Embodiment

According to the first embodiment, the connection supporting apparatus 10 has the NAT presence/absence detecting means (NAT detecting unit 12) between the IPSec client 22, the key exchange mode detecting means (key exchange mode detecting unit 11) of the client apparatus 20, etc., and executes an information setting operation in the client apparatus 20 and the gateway apparatus 40 so as to establish an adequate VPN tunnel.

The gateway apparatus 40 can notify information required for the client apparatus 20 to execute IPSec via the connection supporting apparatus 10. This allows the IPSec client corresponding only to the IKE main mode to safely establish the VPN connection to the gateway apparatus in consideration of the status of the network to which the client is connected.

According to the first embodiment, by applying the IKE main mode with a higher security level than the IKE aggressive mode, a problem that the gateway apparatus becomes an attack target due to the ID-leakage can be avoided originated.

According to the first embodiment, the area to which the IKE main mode can be applied can be changed flexibly according to the construction of the network.

Further, according to the first embodiment, an IPSec client corresponding only to the IKE main mode (e.g., Windows (registered trademark) XP standard IPSec, various IPSec corresponding apparatuses) can flexibly communicate with various gateways on the Internet by merely changing the security policy (SP).

Even in a case where the client apparatus 20 dynamically acquires an IP address using the DHCP (Dynamic Host Configuration Protocol), according to the first embodiment, the client apparatus 20 can be properly connected to the gateway apparatus 40 in IKE main mode by notifying the current IP address of the client to the connection supporting apparatus 10.

According to this embodiment, with respect to a client corresponding to the IKE main mode, a connection to various networks can be easily realized, which has been difficult to realize by the client alone.

The communication key in the first embodiment may be produced and shared between the connection supporting apparatus 10 and the gateway apparatus 40 through exchange of a DH key material using the DH key exchange method, and such a previous common key may be notified to the client apparatus 20.

In addition, it is not essential that the connection supporting apparatus notifies the client apparatus of a gateway list to acquire a response on a designated gateway from the client apparatus. That is, after presence/absence of NAT is judged, the gateway selecting unit may automatically select one or more gateways which have been previously prepared, and transmit a VPN connection request message.

Second Embodiment

Next, a second embodiment of the present invention will be described. In the second embodiment, a description is made on how a client apparatus constructs a VPN with a gateway apparatus and determines a virtual IP address which is set to control appliances.

In a communication operation using ordinary IPSec VPN, a nearly standard protocol, such as Mode-cfg or IPSec DHCP, is used. However, protocols such as Mode-cfg and IPSec DHCP are necessary to be supported by both the client and the gateway. Accordingly, in appliances such as routers corresponding to the IKE main mode, which are arranged at respective small-to-middle-sized network points, the Mode-cfg or IPSec DHCP may not be supported.

Therefore, according to the second embodiment, a virtual address with which IKE is performed is determined between a client and a gateway through a connection supporting apparatus before execution of the IKE without depending on a function of delivering the virtual address in the IKE protocol such as the Mode-cfg or IPSec DHCP. This eliminates the need for the Mode-cfg and IPSec DHCP, and enables setting of a virtual address to a client to be performed without depending on those existing protocols.

The second embodiment has a construction similar to that of the first embodiment, so different structures will be mainly described and the description of common structures will be omitted. In FIG. 9, a connection supporting system 100 according to the second embodiment has a construction similar to that of the first embodiment. It should be noted that FIG. 9 shows a case where the NAT router 30 is not interposed between the connection supporting apparatus 10 and the client apparatus 20.

The operation of the second embodiment is the same as the second operational example of the first embodiment up to the point where the connection supporting apparatus transmits a VPN setting request message to the gateway apparatus 40. It should be noted that, in the second embodiment, the gateway apparatus 40 stores, in the VPN setting request response message, a local subnet address (local subnet address to which the appliance 50 belongs: e.g., 172.0.0.0/24) contained in the gateway apparatus 40.

FIG. 10 is a diagram for showing an example of the format of the VPN setting request response message applied in the second embodiment. As shown in FIG. 10, a local subnet address is stored together with a communication key (previous registration key), which functions as a session ID, in the VPN setting request response message ((2) in FIG. 9).

Upon receipt of the VPN setting request response message, the connection supporting apparatus 10 notifies the client apparatus 20 of a response message containing the local subnet address in addition to the gateway IP address and the communication key (previous registration key) ((2) in FIG. 9).

FIG. 11 is an explanatory diagram of a process operation executed in the client apparatus 20 according to a third embodiment. As shown in FIG. 11, upon receipt of a response message, the connecting unit 21 in the client apparatus 20 produces an arbitrary IP address (e.g., 111.222.111.222/24) on an arbitrary subnet which does not conflict with the local subnet address (172.0.0.0/24) in the response message, as a client virtual IP address, and sets the IP address together with the gateway IP address and the communication key (previous common key) in the IPSec client 22.

As in the first embodiment, the IPSec client 22 executes IKE with the IPSec gateway 42 of the gateway apparatus 40 so as to establish an IPSec SA (VPN tunnel). After that, in the case of transmitting an IP packet to the appliance 50, the client apparatus 20 produces an IP packet which has the IP address of the appliance 50 set as the destination IP address and the client virtual IP address set as the transmission source IP address. This IP packet is sent in the IPSec tunnel mode.

That is, the IP packet is encrypted by a system based on the IPSec SA, and produces an encapsulated packet in which the encrypted IP packet (inner address and data) becomes IP data (IP payload) to which an outer IP header is given. In the outer IP header, the gateway IP address is set as the destination address and the client IP address is set as the transmission source IP address. The encapsulated packet is sent to the gateway apparatus 40 ((3) VPN Data Communication in FIG. 9).

Upon receipt of the encapsulated packet, the gateway apparatus 40 acquires the original IP packet by decryption of the IP data (inner address and data) after the outer IP header is removed. After that, the IP packet is transferred to the appliance 50 according to the destination IP address (appliance IP address) of the original IP packet ((4) Internal Data Communication in FIG. 9).

According to the second embodiment, the client apparatus 20 is assigned with an IP address different from the local subnet address of the gateway apparatus 40 as the IP address of the client apparatus 20. This can prevent the confliction of the IP address of the appliance 50 with the IP address of the client apparatus 20 which would disable routing of the IP packet by the gateway apparatus 40.

In the foregoing description of the operational example, an example in which the NAT router 30 is not interposed has been given. When the NAT router 30 is interposed between the connection supporting apparatus 10 and the client apparatus 20, the notification of the local subnet address to the client apparatus 20 and the generation and setting operations of the virtual IP address in the client apparatus 20 are executed in addition to operations similar to those in the first operational example. In VPN data communication, the client IP address (transmission source IP address) in the outer IP header (outer address: FIG. 9) is converted into a NAT IP address, which then reaches the gateway apparatus 40.

According to the second embodiment, functions and effects similar to those of the first embodiment can be obtained. Further, in the second embodiment, an IPSec communication operation between a client and a gateway can be performed while performing address management even with respect to the client which is not equipped with an address delivery (address management) protocol at an IKE level, such as Mode-cfg or IPSec DHCP.

Further, according to the second embodiment, the client apparatus 20 is assigned with a virtual IP address, so it becomes possible to identify a difference in the address of the client (=inner IP address in IPSec tunnel mode) which performs remote access at a gateway, or a VPN path, in realizing communication in the main mode.

Third Embodiment

Next, a third embodiment of the present invention will be explained. The third embodiment has common points with the first and second embodiments, so differences therebetween will be mainly described and description of common points will be omitted.

As the third embodiment, a description will be made of a main mode remote access support (address pool allocation) by the connection supporting system. In the second embodiment, the description has been made on the method of determining a virtual IP address by the client apparatus 20 based on a local subnet address acquired from the gateway apparatus 40.

In a case where two or more client apparatuses are connected to the gateway apparatus, one client may execute a VPN communication operation with the gateway apparatus using an IP address which conflicts with that of the other client. In this case, there is a fear that control on the confliction of the virtual IP address in the gateway apparatus becomes necessary, or routing to the client becomes difficult.

Figure 12:
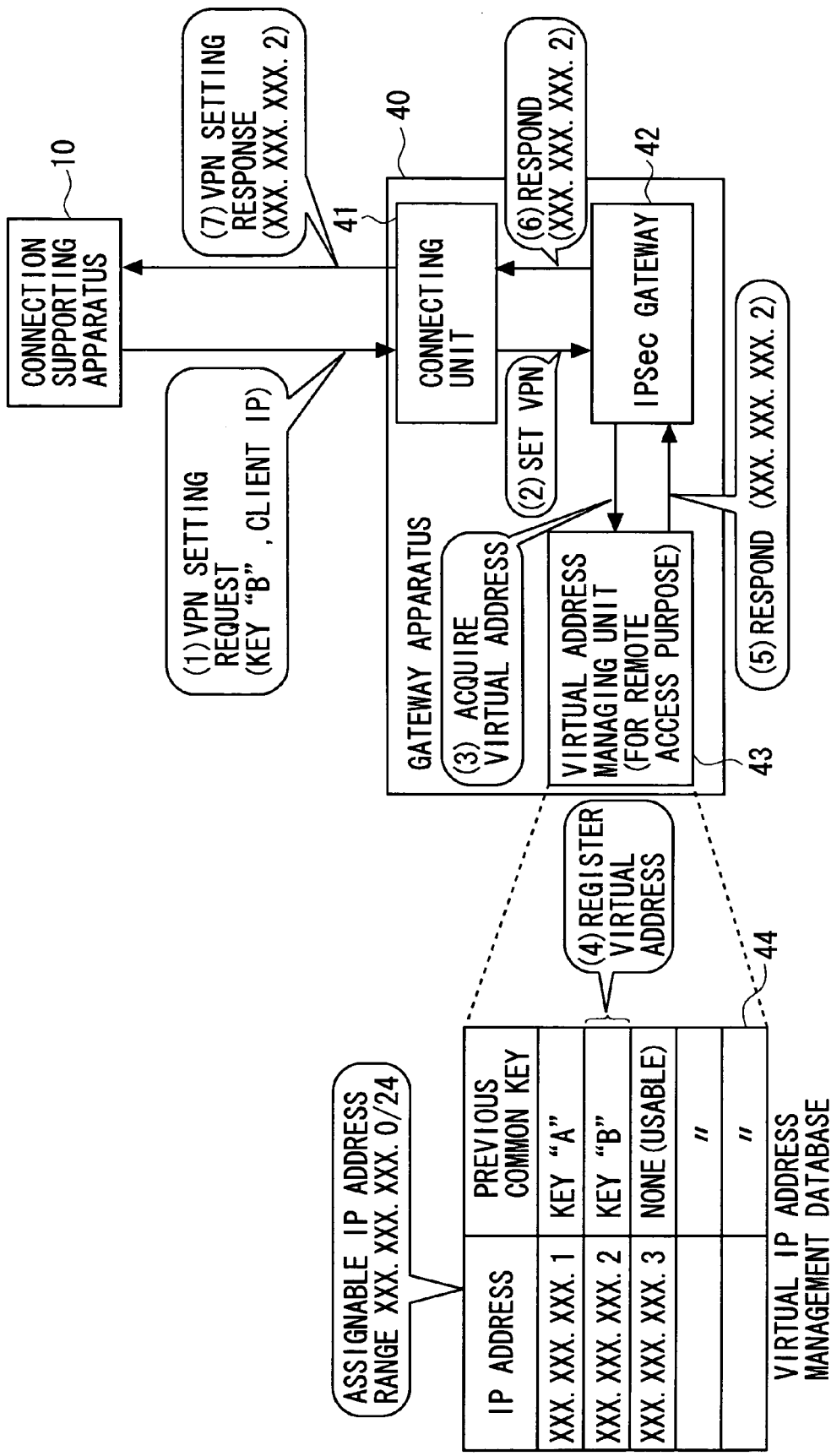
FIG. 12 is an explanatory diagram of a gateway apparatus according to a third embodiment.

In the third embodiment, the gateway apparatus manages an address to be assigned to a client apparatus which performs remote access. FIG. 12 is a diagram for showing a structural example of a gateway apparatus according to the third embodiment.

The gateway apparatus 40 in the third embodiment further contains a virtual address managing unit (for remote access) 43. The virtual address managing unit 43 has a virtual IP address managing database 44.

The virtual IP address managing database stores a virtual IP address list (virtual address pool) belonging to a predetermined assignable IP address range (e.g.: xxx.xxx.xxx.0/24) and information indicating the use status thereof. In this example, a previous common key (communication key) to be set in the client apparatus 20 which uses the virtual IP address in use is stored in association with that virtual IP address in use.

The operation of the gateway apparatus 40 at the time of receiving a VPN setting request message is as follows. The connecting unit 41 of the gateway apparatus 40 receives the VPN setting request message from the connection supporting apparatus 10 ((1) in FIG. 12). A key "B" as a communication key (previous common key) and a client IP address are stored in the VPN setting request message.

Upon receipt of the VPN setting request message, the connecting unit 41 executes a VPN setting operation (setting of the key B and the client IP address) in the IPSec gateway 42 as in the first embodiment ((2) in FIG. 12). The IPSec gateway 42 hands over a virtual address acquisition request (including the key B) to the virtual address managing unit 43 ((3) in FIG. 12). The virtual address managing unit 43 specifies one of unused virtual IP addresses (e.g., xxx.xxx.xxx.2) from the virtual IP address managing database 44, and stores (registers) the key B in the database 44 in association with the virtual IP address ((4) in FIG. 12). Further, the virtual address managing unit 43 extracts the virtual IP address and hands over the virtual IP address to the IPSec gateway 42 as a response to the acquisition request ((5) in FIG. 12).

The IPSec gateway 42 registers the association of the virtual IP address with the key B in an IPSec SA database 45 (FIG. 14), registers the association of the virtual IP address with the main mode ID (client IP address) in an ID managing database 46 (FIG. 14), and then hands over the virtual IP address to the connecting unit 41 ((6) in FIG. 12). The connecting unit 41 produces a VPN setting request response message containing the virtual IP address and the key B, and transmits the response message to the connection supporting apparatus 10 ((7) in FIG. 12).

After that, the connection supporting apparatus 10 transmits the response message containing the virtual IP address, the gateway IP address, and the communication key (previous common key: key B) to the client apparatus 20. Different from the third embodiment, the connecting unit 21 of the client apparatus 20 sets the virtual IP address, the gateway IP address, and the communication key (key B) in the IPSec client 22 without producing the virtual IP address.

As in the third embodiment, the IPSec client 22 establishes a VPN tunnel between the client apparatus 20 and the gateway apparatus 40. After that, a VPN data communication operation is executed in transmitting data from the client apparatus 20 to the appliance 50. At this time, the IPSec client 22 uses the virtual IP address given from the gateway apparatus 40 as a client virtual IP address.

After that, when the data transmission from the client apparatus 20 to the appliance 50 is ended and VPN between the gateway apparatus 40 and the client apparatus 20 is ended, the client apparatus 20 transmits a VPN end request message to the gateway apparatus 40.

Figure 13:
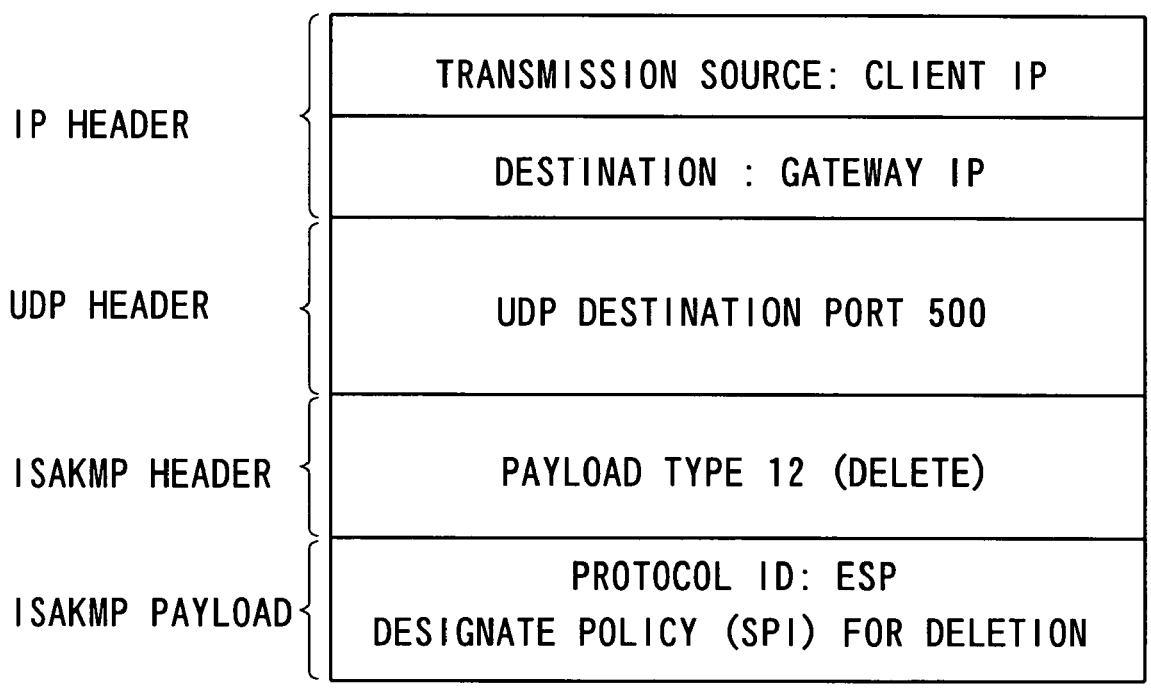
FIG. 13 is an explanatory diagram of a format example of a VPN end request message according to the third embodiment.

FIG. 13 is a diagram for explaining an example of the format of the VPN end request message. For example, an ISAKMP Informational Exchange message defined in IKE is used as the VPN end request message. In the message, a security policy to be deleted is designated by an ISAKMP payload. In the example shown in FIG. 13, "payload type 12" indicates deletion of the ISAKMP SA, and "protocol ID:ESP" indicates deletion of the IPSec SA. In this case, the virtual IP address is used as identification information SPI of the IPSec SA. The VPN containing request message contains requests to delete those SA's.

FIG. 14 is an explanatory diagram for explaining a VPN end process operation in the gateway apparatus 40. In FIG. 14, the gateway apparatus 40 receives the VPN end request message (containing request to delete virtual IP address (xxx.xxx.xxx.2)) from the client apparatus 20 ((1) in FIG. 14).

Then, the IPSec gateway 42 deletes an entry corresponding to the IPSec SA deletion request (i.e., entry in which association of the virtual IP address with the key B is stored) from the IPSec SA database 45 ((2): Delete IPSec SA in FIG. 14). At this time, the previous common key (key B) is extracted from the database 45, and the IPSec gateway 42 deletes the main mode ID (client IP address) corresponding to the key B from the ID managing database 46 ((3) in FIG. 14).

Next, the IPSec gateway 42 hands over a virtual address deletion instruction to the virtual address managing unit 43 ((4) in FIG. 14). The virtual address managing unit 43 extracts the entry of the virtual IP address (xxx.xxx.xxx.2) designated by the deletion instruction from the database 44, and overwrites "key B" stored in the entry with "0". Accordingly, "key B" is deleted from the database 44, and the virtual IP address (xxx.xxx.xxx.2) becomes assignable (available) ((5) in FIG. 14).

The virtual address managing unit 43 notifies the gateway apparatus 40 of the deletion of the key B ((6) in FIG. 14). The IPSec gateway 42 notifies the connecting unit 41 of the deletion of the virtual IP address (xxx.xxx.xxx.2). Then, the connecting unit 41 transmits a VPN end message (BYE message) to the connection supporting apparatus 10 ((8) in FIG. 14), and receives a response message to the VPN end message (VPN end response (BYE response) message) from the connection supporting apparatus 10 ((9) in FIG. 14).

In this manner, entries in the respective databases 44, 45, and 46 are produced at the time of requesting a VPN setting operation, and are deleted at the time of ending the VPN.

FIG. 15 is a diagram for showing an example of the VPN end message to be sent to the connection supporting apparatus 10 from the gateway apparatus 40. In the example shown in FIG. 15, the end message has an SIP-based format and an area in which an SDP portion to be used in the SIP is originally expanded. The previous common key (communication key) related to VPN to be deleted is stored in the expanded area.

The connection supporting apparatus 10 has a database (not shown) for managing information on VPN related to connection support. In the database, Entries storing information such as the communication key (previous common key), the client IP address, the gateway IP address, and the NAT IP address is stored as information related to VPN, and the entry can be searched with the communication key as a key.

At the time of receiving the VPN end message, the connection supporting apparatus 10 searches for a corresponding entry with the communication key contained in the message as the key, and deletes the entry from the database. Upon deletion of the entry, the connection supporting apparatus 10 produces a VPN end response message and transmits the message to the gateway apparatus 40. FIG. 16 is a diagram for showing an example of the VPN end response message to be sent to the gateway apparatus 40 from the connection supporting apparatus 10.

According to the third embodiment, the gateway apparatus 40 manages an IP address to be assigned to the client apparatus 20, determines a virtual IP address to be assigned to the client apparatus 20 at the time of receiving a VPN setting request message from the connection supporting apparatus 10, and notifies the virtual IP address by the VPN setting request response message.

Accordingly, allocation of an IP address is performed between the client apparatus 20 and the gateway apparatus 40 before the IKE is executed. It is therefore possible to realize an IPSec communication operation even with respect to a client and an appliance which are not equipped with an address management protocol. When the client apparatus 20 logs out from the gateway apparatus 40, the address of the client apparatus 20 is set blank, and is deleted from the routing table (databases 45 and 46).

[Others]

The above-described embodiments of the present invention disclose the claimed inventions. Also, structural elements contained in any of the claimed invention may be combined with structural elements of other claims.

The disclosures of Japanese patent application No. JP2006-249533 filed on Sep. 14, 2006 including the specification, drawings and abstract are incorporated herein by reference.

What is claimed is:

1. A connection supporting apparatus for supporting to establish a Virtual Private Network (VPN) through an Internet Key Exchange (IKE) between a first apparatus and a second apparatus, the connection supporting apparatus comprising:

a processor that executes a procedure, the procedure comprising:
receiving authentication information of the first apparatus employed in the IKE;
judging whether or not a key exchange mode of the first apparatus is a main mode based on the authentication information;
judging whether or not an Internet Protocol (IP) address converting apparatus is interposed between the connection supporting apparatus and the first apparatus based on the authentication information and a source IP address of an IP packet when receiving the IP packet containing the authentication information of the first apparatus,
transmitting a VPN setting request to the second apparatus when the key exchange mode of the first apparatus is the main mode, the VPN setting request containing the authentication information and a communication key to be used when the first apparatus executes the IKE with respect to the second apparatus; and
transmitting both the communication key transmitted to the second apparatus from the connection supporting apparatus and an IP address of the second apparatus to the first apparatus when receiving a response with respect to the VPN setting request from the second apparatus,
wherein when the IP address converting apparatus is interposed between the connection supporting apparatus and the first apparatus, the processor executing a procedure for transmitting a VPN setting request which further contains the source IP address of the IP packet to the second apparatus.

2. The connection supporting apparatus according to claim 1, wherein if the key exchange mode of the first apparatus is the main mode, the processor executes a procedure for transmitting a list of a plurality of second apparatuses to the first apparatus, and when a return containing information indicative of one of the plurality of second apparatuses determined by the first apparatus is received, the processor executes the procedure for transmitting the VPN setting request to one of the plurality of second apparatus.

3. The connection supporting apparatus according to claim 1, wherein the connection supporting apparatus receives a response of the VPN setting request which contains the communication key transmitted to the second apparatus.

4. The connection supporting apparatus according to claim 1, wherein if a response message of the VPN setting request containing information as to a subnet address to which a communication counterpart of the first apparatus accommodated in the second apparatus belongs is received from the second apparatus, the processor executes a procedure for transmitting the information as to the subnet address to the first apparatus.

5. The connection supporting apparatus according to claim 1, wherein if a response of the VPN setting request containing an IP address to be assigned to the first apparatus is received from the second apparatus, the processor executes the procedure for transmitting the IP address to the first apparatus.

6. The connection supporting apparatus according to claim 1, wherein when the authentication information of the first apparatus contains a format of an IP address, the processor executes the procedure for judging that the key exchange mode of the first apparatus is the main mode.

7. The connection supporting apparatus according to claim 1, wherein if the IP address serving as the authentication information of the first apparatus matches the source IP address of the IP packet, the processor executes the procedure for judging that the IP address converting apparatus is not interposed between the connection supporting apparatus and the first apparatus, and if both the IP addresses do not match each other, the processor executes the procedure for judging that the IP address converting apparatus is interposed between the connection supporting apparatus and the first apparatus.

8. A gateway apparatus comprising:
a processor that executes a procedure, the procedure comprising:
receiving a Virtual Private Network (VPN) setting request message from a connection supporting apparatus, the VPN setting request message containing both a communication key to be transmitted to a client apparatus which requests the connection supporting apparatus to establish a VPN through the IKE between the client apparatus and the gateway apparatus from the connection supporting apparatus and to be used in an Internet Key Exchange (IKE), and an Internet Protocol (IP) address of the client apparatus serving as authentication information of the client apparatus;
transmitting a response message with respect to the received VPN setting request message to the connection supporting apparatus; and
establishing the VPN through the IKE between the client apparatus and the gateway apparatus by employing the communication key and the IP address of the client apparatus serving as the authentication information,
wherein when an address converting apparatus is interposed between the connection supporting apparatus and the client apparatus, the processor executes a procedure for receiving the VPN setting request message which further contains an IP address of the address converting apparatus.

9. The gateway apparatus according to claim 8, wherein the processor executes a procedure for returning the response message containing the communication key to the connection supporting apparatus.

10. The gateway apparatus according to claim 8, wherein the processor executes a procedure for returning to the connection supporting apparatus, the response message containing a subnet address to which a communication counterpart of the client apparatus accommodated in the gateway apparatus belongs.

11. The gateway apparatus according to claim 8, wherein when receiving the VPN setting request message, a virtual IP address to be assigned to the client apparatus is determined, and the processor executes a procedure for returning the response message containing the determined virtual IP address to the connection supporting apparatus.

* * * * *